United States Patent
Murata et al.

(10) Patent No.: US 9,599,160 B2
(45) Date of Patent: Mar. 21, 2017

(54) TAPERED ROLLER BEARING

(71) Applicant: JTEKT CORPORATION, Osaka-shi, Osaka (JP)

(72) Inventors: Junji Murata, Kashiba (JP); Shigeo Kamamoto, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/812,533

(22) Filed: Jul. 29, 2015

(65) Prior Publication Data

US 2016/0040718 A1    Feb. 11, 2016

(30) Foreign Application Priority Data

Aug. 11, 2014   (JP) .................................. 2014-163775

(51) Int. Cl.
*F16C 33/36*   (2006.01)
*F16C 19/36*   (2006.01)
*F16C 33/58*   (2006.01)

(52) U.S. Cl.
CPC .......... *F16C 33/366* (2013.01); *F16C 33/585* (2013.01); *F16C 19/364* (2013.01); *F16C 2240/50* (2013.01)

(58) Field of Classification Search
CPC ........ F16C 19/34; F16C 19/36; F16C 19/364; F16C 19/383–19/388; F16C 33/58; F16C 33/583; F16C 33/585; F16C 33/366; F16C 2240/50
See application file for complete search history.

(56) References Cited

U.S. PATENT DOCUMENTS

| | | | | |
|---|---|---|---|---|
| 3,525,558 | A * | 8/1970 | Johnston | F16C 19/225 384/465 |
| 6,033,123 | A * | 3/2000 | Sato | F16C 19/225 384/571 |
| 6,379,049 | B1 * | 4/2002 | Shibazaki | F16C 19/225 384/450 |
| 6,464,398 | B2 * | 10/2002 | Takehara | F16C 19/225 384/450 |
| 6,502,996 | B2 * | 1/2003 | Joki | F16C 19/364 384/450 |
| 6,530,693 | B1 * | 3/2003 | Ijuin | F16C 19/225 384/450 |

(Continued)

FOREIGN PATENT DOCUMENTS

| | | |
|---|---|---|
| JP | H04-331813 A | 11/1992 |
| JP | H05-75520 U | 10/1993 |
| JP | 2006-349014 A | 12/2006 |

*Primary Examiner* — Alan B Waits
(74) *Attorney, Agent, or Firm* — Oliff PLC

(57) ABSTRACT

A tapered roller bearing includes: an inner ring; an outer ring; a plurality of tapered rollers having a roller large end face that is a convex curved surface; and an annular cage that holds the tapered rollers at intervals along a circumferential direction. The inner ring includes a large rib portion having a rib surface that is a concave curved surface and that contacts the roller large end face. Inequalities represented by R>Ri>Rr are satisfied, where Rr is a curvature radius of the roller large end face, Ri is a curvature radius of the rib surface in a longitudinal cross section of the inner ring, and R is a distance from a cone center to a center of a contact ellipse obtained by contact between the roller large end face and the rib surface.

2 Claims, 6 Drawing Sheets

(56) References Cited

U.S. PATENT DOCUMENTS

| | | | |
|---|---|---|---|
| 6,623,168 B2* | 9/2003 | Matsuyama | F16C 19/225 384/450 |
| 6,702,471 B2* | 3/2004 | Sakoda | F16C 19/225 384/450 |
| 7,874,737 B2* | 1/2011 | Matsuyama | F16C 33/36 384/450 |
| 8,152,383 B2* | 4/2012 | Ueno | F16C 19/364 384/571 |
| 9,243,667 B2* | 1/2016 | Kamamoto | F16C 37/007 |
| 2007/0041678 A1* | 2/2007 | Matsuyama | F16C 19/225 384/571 |
| 2015/0198202 A1* | 7/2015 | Murata | F16C 33/585 384/571 |

* cited by examiner

TAPERED ROLLER BEARING

INCORPORATION BY REFERENCE

The disclosure of Japanese Patent Application No. 2014-163775 filed on Aug. 11, 2014 including the specification, drawings and abstract, is incorporated herein by reference in its entirety.

BACKGROUND OF THE INVENTION

1. Field of the Invention

The invention relates to a tapered roller bearing.

2. Description of Related Art

As depicted in FIG. 7, a tapered roller bearing 90 includes an inner ring 91, an outer ring 93, a plurality of tapered rollers 95, and an annular cage 96. The inner ring 91 has a tapered inner ring raceway surface 92. The outer ring 93 has a tapered outer ring raceway surface 94. The tapered rollers 95 roll on the inner ring raceway surface 92 and the outer ring raceway surface 94. The cage 96 holds the tapered rollers 95 at intervals along a circumferential direction. The inner ring 91 has a cone back face rib portion (hereinafter, referred to as a large rib portion) 97 protruding radially outward on a large diameter side of the inner ring 91. The large rib portion 97 has an annular rib surface 99 that contacts a roller large end face 98 of each of the tapered rollers 95.

Rotation of the tapered roller bearing 90 brings the roller large end face 98 of each tapered roller 95 into sliding contact with the rib surface 99 of the inner ring 91. Thus, to reduce frictional resistance (sliding frictional resistance) between the roller large end face 98 and the rib surface 99, the roller large end face 98 has a convex curved surface with a predetermined curvature radius, and the rib surface 99 has a recessed curved surface with a predetermined curvature radius (see, for example, Japanese Utility Model Application Publication No. 115-75520 (JP 5-75520 U)).

For the tapered roller bearing 90 as described above, there has been no specific definite guideline that specifies how to set the curvature radius of the roller large end face 98 of each tapered roller 95 and the curvature radius of the rib surface 99 of the inner ring 91. Thus, a very effective reduction in frictional resistance may not be expected depending on the values of the curvature radii of the roller large end face 98 and the rib surface 99.

SUMMARY OF THE INVENTION

An object of the present invention is to provide a tapered roller bearing that enables an effective reduction in frictional resistance between roller large end faces of tapered rollers and a rib surface of an inner ring.

According to an aspect of the present invention, a tapered roller bearing includes: an inner ring having a tapered inner ring raceway surface, an outer ring having a tapered outer ring raceway surface; a plurality of tapered rollers that is able to roll on the inner ring raceway surface and the outer ring raceway surface, the tapered rollers each having a roller large end face that is a convex curved surface; and an annular cage that holds the tapered rollers at intervals along a circumferential direction. The inner ring includes a large rib portion having, on a large diameter side thereof, a rib surface that is a concave curved surface and that contacts the roller large end face. Inequalities represented by R>Ri>Rr is satisfied, where Rr is a curvature radius of the roller large end face, Ri is a curvature radius of the rib surface in a longitudinal cross section of the inner ring, and R is a distance from a cone center to a center of a contact ellipse obtained by contact between the roller large end face and the rib surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a diagram illustrating the shapes of a rib surface of an inner ring, a roller large end face of a tapered roller, and the like;

FIG. 4A illustrates a case where the difference between curvature radii is small, and FIG. 4B illustrates a case where the difference between the curvature radii is large;

DETAILED DESCRIPTION OF EMBODIMENTS

An embodiment of the present invention will be described below based on the drawings.

Figure 1:
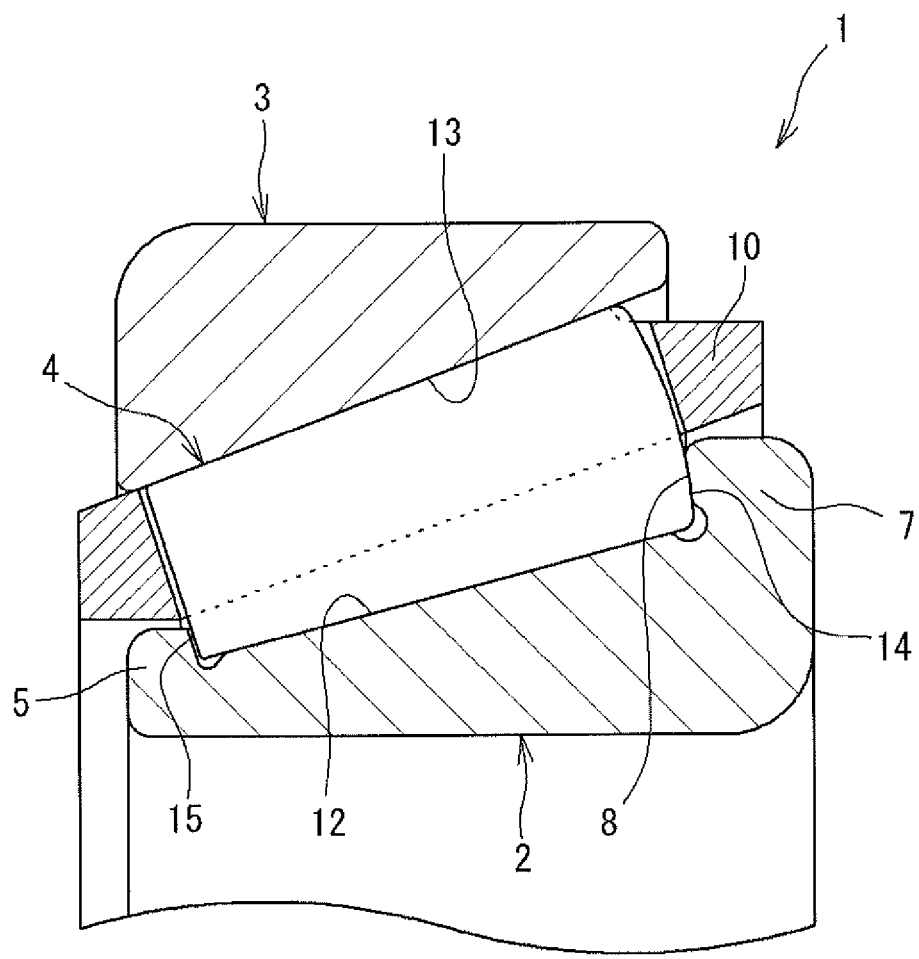
FIG. 1 is a longitudinal sectional view depicting an embodiment of a tapered roller bearing of the present invention.

FIG. 1 is a longitudinal sectional view depicting an embodiment of a tapered roller bearing 1 of the present invention. The tapered roller bearing 1 includes an inner ring 2, an outer ring 3, a plurality of tapered rollers 4, and an annular cage 10. The outer ring 3 is provided on a radially outer side of the inner ring 2 so as to be concentric with the inner ring 2. The tapered rollers 4 are provided between the inner ring 2 and the outer ring 3. The cage 10 holds the tapered rollers 4 at intervals along a circumferential direction.

The inner ring 2 is an annular member formed of bearing steel, steel for machine structural use, or the like. The inner ring 2 has a tapered inner ring raceway surface 12 (formed of a part of a conical surface) on an outer periphery of the inner ring 2. Like the inner ring 2, the outer ring 3 is an annular member formed of bearing steel, steel for machine structural use, or the like, and has a tapered outer ring raceway surface 13 (formed of a part of a conical surface) on an inner periphery of the outer ring 3. The inner ring raceway surface 12 and the outer ring raceway surface 13 face each other. When the tapered roller bearing 1 rotates, the tapered rollers 4 roll on the inner ring raceway surface 12 and the outer ring raceway surface 13. The tapered rollers 4 are each a member shaped like a truncated cone and formed of bearing steel or the like. The tapered rollers 4 each have a roller large end face 14 with a large diameter on a first axial side of the tapered roller 4 and a roller small end face 15 with a small diameter on a second axial side of the tapered roller 4. The roller large end face 14 is shaped like a convex curved surface.

The inner ring 2 has a large rib portion 7 on a large diameter side of the outer periphery of the inner ring 2. The large rib portion 7 is provided adjacent to a first axial end of the inner ring raceway surface 12 so as to protrude outward in a radial direction. A rib surface 8 that is an end surface of the large rib portion 7 closer to the inner ring raceway surface 12 is shaped like a concave curved surface. The large rib portion 7 is annular, and thus the rib surface 8 is also an annular surface. The inner ring 2 has a small rib portion 5 on a small diameter side of the outer periphery of the inner ring 2. The small rib portion 5 is provided adjacent to a second axial end of the inner ring raceway surface 12 so as to protrude outward in the radial direction.

The roller large end face 14 of each tapered roller 4 can come into contact with the rib surface 8. When the tapered roller bearing 1 rotates, the rib surface 8 and the roller large end face 14 are brought into sliding contact with each other. Since the roller large end face 14 is a convex curved surface and the rib surface 8 is a concave curved surface, when the rib surface 8 is in contact (sliding contact) with the roller large end face 14, the contact surface (sliding contact surface) is elliptical. In other words, a contact ellipse M (see FIG. 2) is formed between the roller large end face 14 and the rib surface 8. Furthermore, a lubricant (including grease) is supplied to the tapered roller bearing 1. When the tapered roller bearing 1 rotates (for example, when the inner ring 2 rotates), the lubricant flows in the circumferential direction along the annular rib surface 8.

Figure 2:
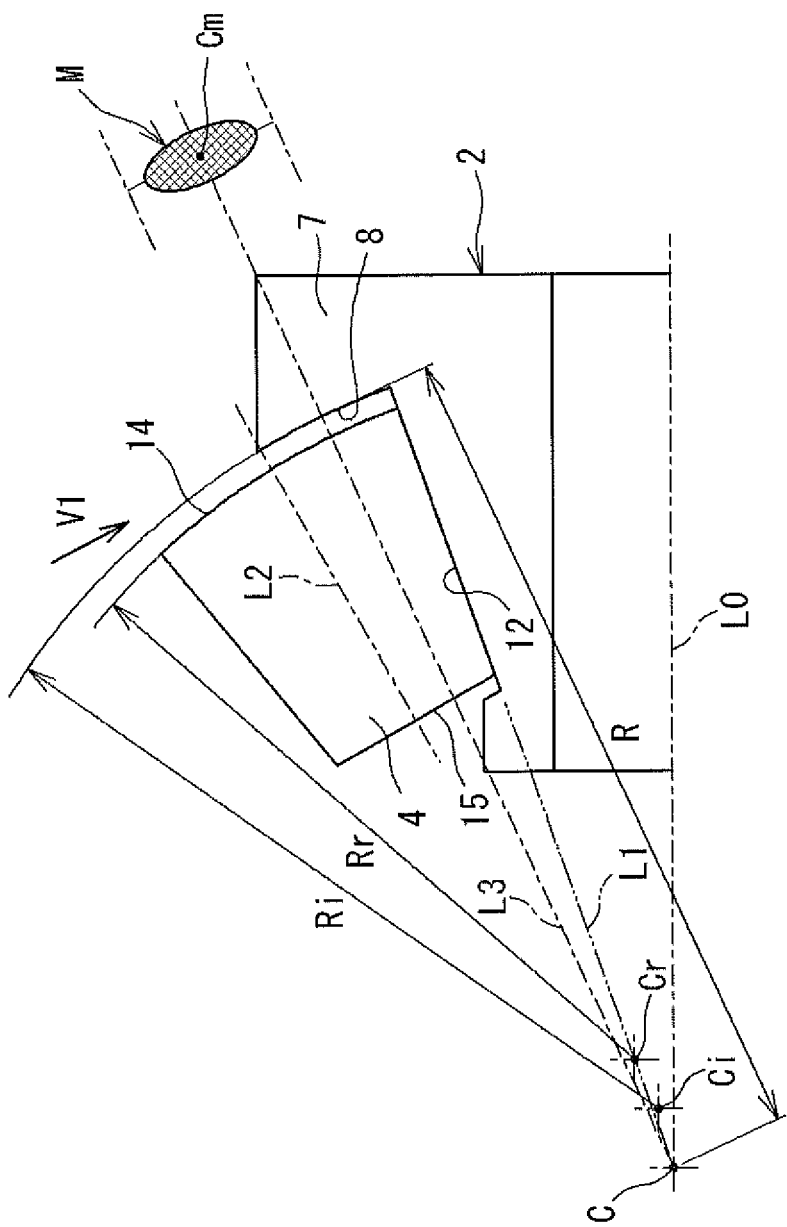

FIG. 2 is a diagram illustrating the shapes of the rib surface 8 of the inner ring 2, the roller large end face 14 of the tapered roller 4, and the like. FIG. 2 is a model diagram depicting the tapered roller 4 superimposed on a longitudinal cross section of the inner ring 2 (as a cross section). In FIG. 2, the inner ring 2 and the tapered roller 4 are depicted in a deformed manner for description. Although the roller large end face 14 of the tapered roller 4 and the rib surface 8 of the inner ring 2 are actually in contact with each other, the roller large end face 14 and the rib surface 8 are illustrated such that they are apart from each other for description. The longitudinal cross section of the inner ring 2 is a cross section including a center line L0 of the inner ring 2.

The roller large end face 14 is a part of a spherical surface, and the curvature radius of the roller large end face 14 is defined as "Rr". Therefore, the curvature radius of the roller large end face 14 in the longitudinal cross section of the tapered roller 4 (FIG. 2) illustrated on the same cross section as the longitudinal cross section of the inner ring 2 is "Rr". The curvature radius of the roller large end face 14 in a cross section that is orthogonal to the longitudinal cross section (FIG. 2) and that passes through a center line L2 of the tapered roller 4 is also "Rr".

Figure 3:
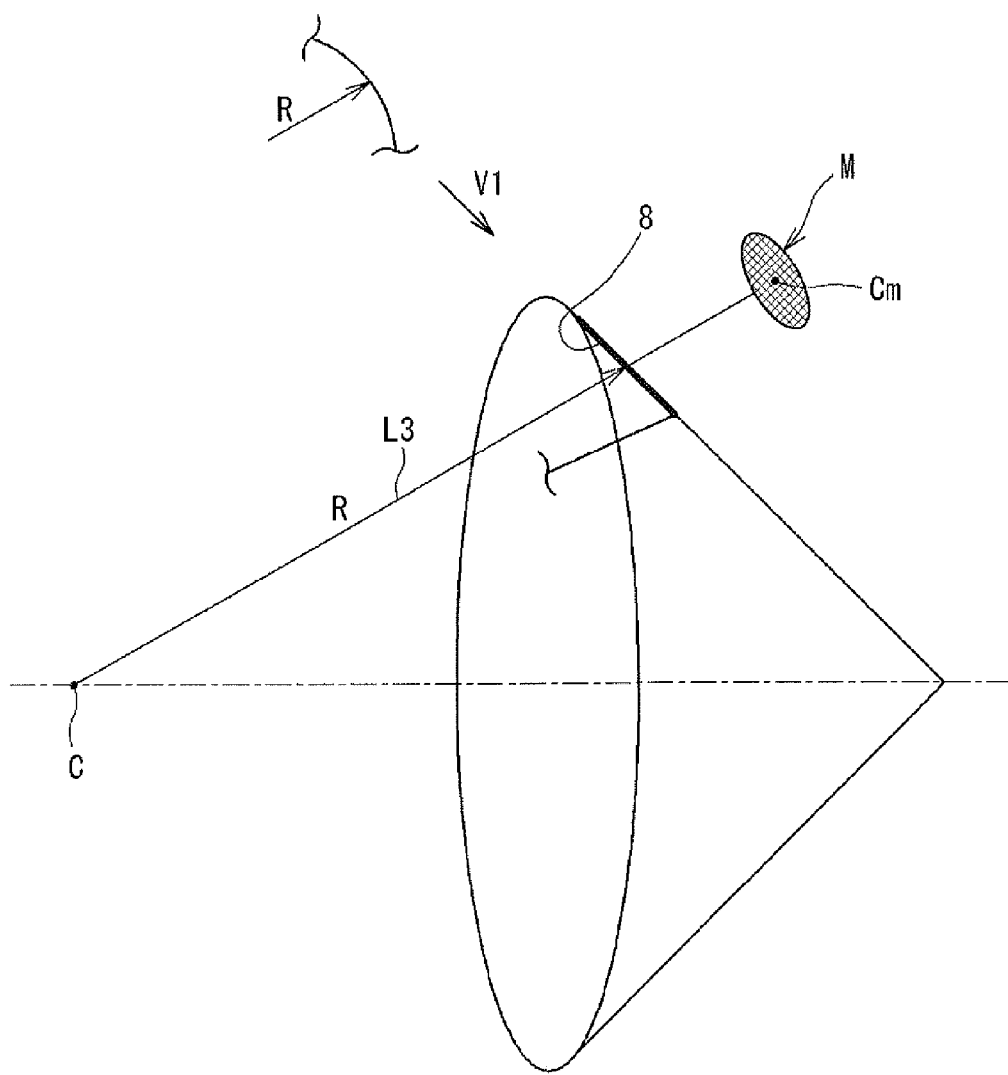
FIG. 3 is a schematic diagram illustrating the shape of the rib surface.

The curvature radius of the rib surface 8 in the longitudinal cross section of the inner ring 2 (FIG. 2) is defined as "Ri". FIG. 3 is a schematic diagram illustrating the shape of the rib surface 8. As described above, the curvature radius of the rib surface 8 in the longitudinal cross section of the inner ring 2 (FIG. 2) is "Ri". However, as depicted in FIG. 3, the curvature radius of the rib surface 8 is "R" when the rib surface 8 is viewed from a radially outer side in a direction that is orthogonal to a virtual straight line L3 connecting a cone center C to a center Cm of the contact ellipse M (the direction of arrow V1; hereinafter referred to as a virtual radial direction). In other words, the rib surface 8 has two curvature radii "Ri" and "R" depending on the viewing direction.

In FIG. 2, the distance from the cone center C to the center Cm of the contact ellipse M obtained by the contact between the roller large end face 14 and the rib surface 8 is defined as "R". The cone center C is the cone center of the tapered roller 4 and is a vertex of a conical shape including the tapered roller 4. The cone center C is also an intersection point between an extension L1 of the inner ring raceway surface 12 and the center line L0 of the inner ring 2 in the longitudinal cross section of the inner ring 2. The cone center C, a center Cr of the roller large end face 14, and a center Ci of the rib surface 8 are present at different positions. The center Cr is positioned on an extension of the center line L2 of the tapered roller 4.

In the tapered roller bearing 1, inequalities represented by R>Ri>Rr are satisfied. Thus, as described below, the contact ellipse M obtained by the contact between the roller large end face 14 of the tapered roller 4 and the rib surface 8 of the inner ring 2 is shaped to be small in a circumferential direction of the inner ring 2 and to be large in a direction orthogonal to the circumferential direction.

A relation between the inequalities represented by "R>Ri>Rr" and the shape of the contact ellipse M will be described.

As described above, since the roller large end face 14 of the tapered roller 4 is a part of a spherical surface, the curvature radius of the roller large end face 14 in the longitudinal cross section of the inner ring 2 (see FIG. 2) is "Rr". The curvature radius of the roller large end face 14 in the cross section that is orthogonal to the longitudinal cross section and that passes through the center line L2 of the tapered roller 4 is also "Rr". In contrast, the curvature radius of the rib surface 8 of the large rib portion 7 in the longitudinal cross section of the inner ring 2 (see FIG. 2) is "Ri". However, the curvature radius of the rib surface 8 is "R" when the rib surface 8 is viewed from the radially outer side in the direction that is orthogonal to the virtual straight line L3 connecting the cone center C to the center Cm of the contact ellipse M (the direction of arrow V1) (see FIG. 3).

Figure 4A:
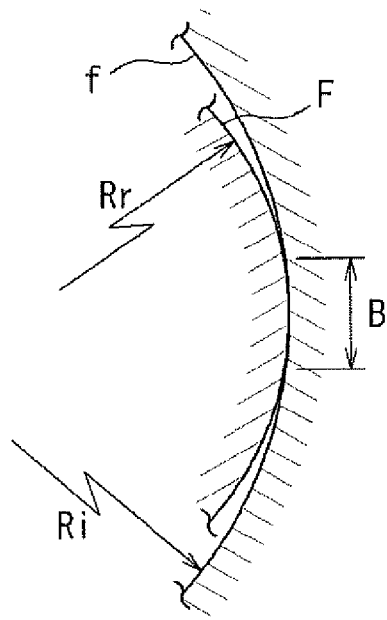
FIGS. 4A and 4B are diagrams each illustrating a contact width between a convex curved surface (roller large end face) and a recessed curved surface (rib surface) that contact each other.
Figure 4B:
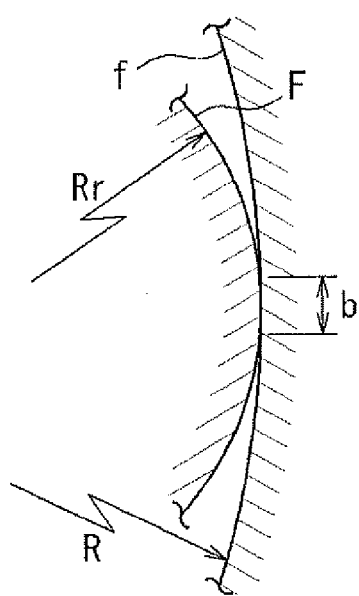

The form of the contact between the roller large end face 14 of the tapered roller 4 that is a convex curved surface and the rib surface 8 of the inner ring 2 that is a concave curved surface will be described by taking a simple example using a generalized convex curved surface F and a generalized concave curved surface f as depicted in FIG. 4A and FIG. 4B.

As depicted in FIG. 4A, it is assumed that the convex curved surface F has the curvature radius Rr and that the concave curved surface f has the curvature radius Ri. In FIG. 4A, when the curvature radius Rr of the convex curved surface F has, for example, a value of "1000" and the curvature radius Ri of the concave curved surface f has, for example, a value of "1003", a difference δ1 between the curvature radii Rr and Ri is "3" (=1003−1000). Furthermore, as depicted in FIG. 4B, it is assumed that the convex curved surface F has the curvature radius Rr as is the case with FIG. 4A but that the concave curved surface f has the curvature radius R (that is larger than Ri). In FIG. 4B, when the curvature radius Rr of the convex curved surface F is "1000" and the curvature radius R of the concave curved surface f has, for example, a value of "1005", a difference δ2 between the curvature radii Rr and R is "5" (=1005−1000).

When the difference δ1 between the curvature radius Rr and the curvature radius Ri (=3) is small (compared to the difference δ2 in curvature radius (=5) in FIG. 4B) as in the case of FIG. 4A, a contact width (contact length) B between the convex curved surface F and the concave curved surface f is large (compared to the contact width in FIG. 4B). In contrast, when the difference δ2 in curvature radius (=5) is large (compared to the difference δ1 in curvature radius (=3) in FIG. 4A) as in the case of FIG. 4B, a contact width (contact length) b between the convex curved surface F and the concave curved surface f is small (compared to the contact width in FIG. 4A) (b<B). That is, if the convex curved surface F and the concave curved surface f, which are different in curvature radius, contact each other, the contact width B between the convex curved surface F and the concave curved surface f is relatively large (wide) when the difference in curvature radius between the convex curved surface F and the concave curved surface f is small (FIG. 4A). In contrast, the contact width b between the convex curved surface F and the concave curved surface f is relatively small (narrow) when the difference in curvature radius between the convex curved surface F and the concave curved surface f is large (FIG. 4B). The contact width (B) increases as the difference in curvature radius between the convex curved surface F and the concave curved surface f decreases. The contact width (b) decreases as the difference in curvature radius between the convex curved surface F and the concave curved surface f increases.

The present embodiment will be described based on the description of the generalized case. As described above, in the present embodiment (see FIG. 2), the inequalities represented by R>Ri>Rr are satisfied. In other words, the distance (curvature radius) "W" from the cone center C to the center Cm of the contact ellipse M and the curvature radius "Ri" of the rib surface 8 are each larger than the curvature radius "Rr" of the roller large end face 14 (R>Rr and Ri>Rr). The curvature radius R is larger than the curvature radius Ri (R>Ri). When the forms depicted in FIG. 4A and FIG. 4B are applied to the present embodiment, the diagram depicted in FIG. 4A corresponds to a longitudinal cross section of the inner ring 2 (FIG. 2), and the diagram depicted in FIG. 4B corresponds to a sectional view of the inner ring 2 as viewed in the virtual radial direction (the direction of arrow V1 in FIG. 2 and FIG. 3).

Figure 6:
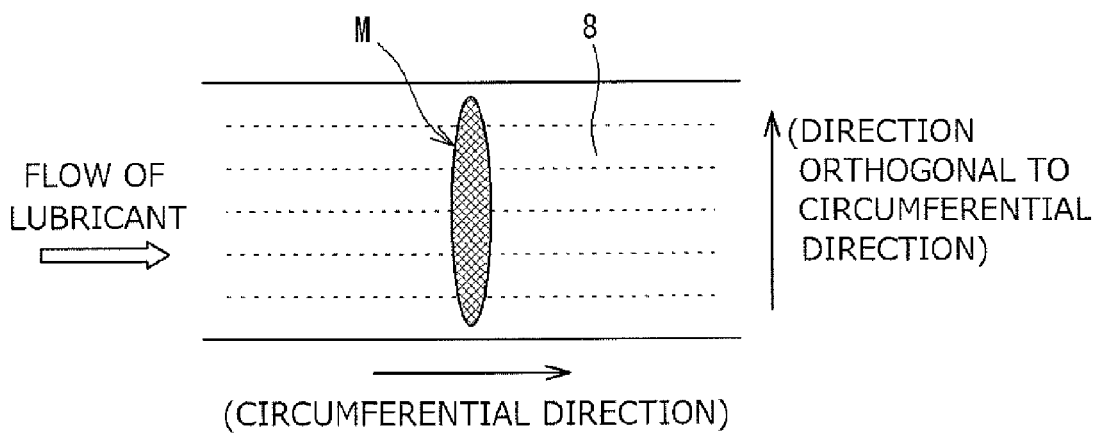
FIG. 6 is a diagram illustrating a contact ellipse in the tapered roller bearing of the present embodiment.
Figure 7:
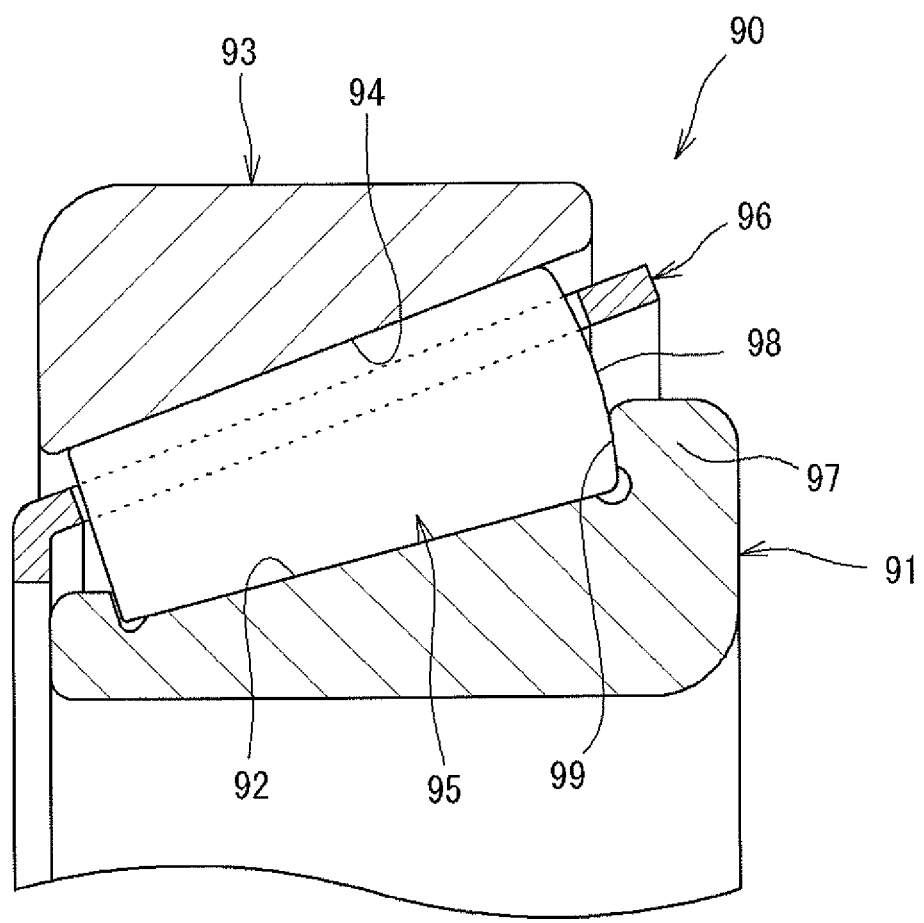
FIG. 7 is a longitudinal sectional view of a conventional tapered roller bearing.

Thus, the width dimension (B) of the contact ellipse M on the longitudinal cross section of the inner ring 2 (FIG. 4A) is larger than the width dimension (b) of the contact ellipse M on the cross section of the inner ring 2 as viewed in the virtual radial direction (FIG. 4B). That is, in the case of FIG. 4A, the contact ellipse M obtained by the contact between the roller large end face 14 of the tapered roller 4 and the rib surface 8 of the inner ring 2 is shaped like an ellipse that is small in the circumferential direction and is large in the direction orthogonal to the circumferential direction as depicted in FIG. 6. In other words, the contact ellipse M that is longer in the direction orthogonal to the circumferential direction of the inner ring 2 than in the circumferential direction of the inner ring 2 is formed between the rib surface 8 of the inner ring 2 and the roller large end face 14 of the tapered roller 4. The contact ellipse M has an ellipticity (B/b) that is larger than 1 (ellipticity >1).

Figure 5:
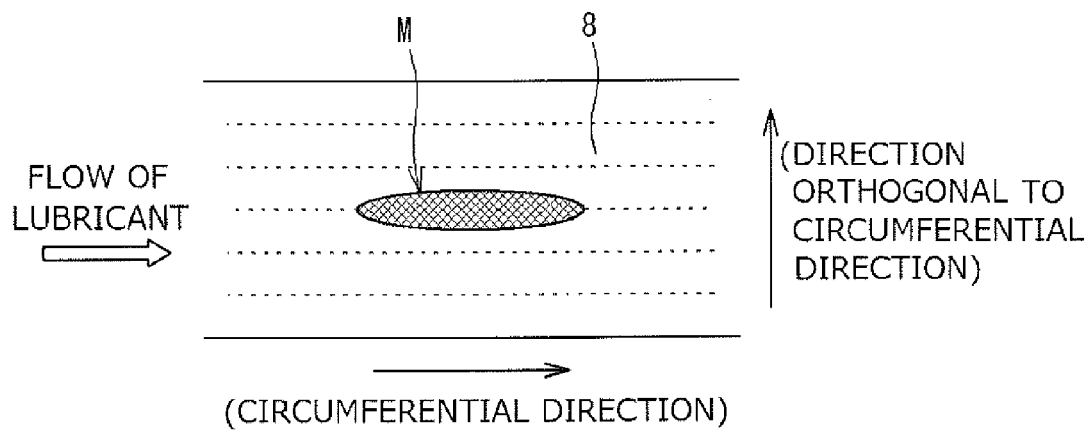
FIG. 5 is a diagram illustrating a contact ellipse in a conventional tapered roller bearing.

A contact ellipse M of a conventional tapered roller bearing will be described. A tapered roller bearing has been proposed in which, in a longitudinal cross section of an inner ring, a rib surface of the inner ring is a concave curved surface as disclosed in JP 5-75520 U. However, in currently available tapered roller bearings, the rib surface of the inner ring is generally a flat surface rather than a concave curved surface. When the rib surface is a flat surface, the curvature radius Ri of the rib surface of the inner ring (see FIG. 2) is infinite. Therefore, if this case is described by reference to FIG. 4, the curvature radius Ri is infinite and large. Since the inequalities represented by Rr<Ri and R<Ri are satisfied, the inequality represented by B<b is satisfied. Accordingly, the contact ellipse M is shaped like an ellipse that is long in the circumferential direction of the inner ring and is short in the direction orthogonal to the circumferential direction of the inner ring as depicted in FIG. 5. In other words, the contact ellipse M has an ellipticity that is smaller than 1 (ellipticity <1).

In contrast, in the present embodiment, the contact ellipse M obtained by the contact between the roller large end face 14 of the tapered roller 4 and the rib surface 8 of the inner ring 2 is shaped like an ellipse that is small in the circumferential direction of the inner ring 2 and is large in the direction orthogonal to the circumferential direction as described above (see FIG. 6). As described above, when the tapered roller bearing 1 rotates, the lubricant on the rib surface 8 flows in the circumferential direction of the inner ring 2. Thus, when the contact ellipse M in the present embodiment has the shape (see FIG. 6), the flow of the lubricant is hindered over a wide range on the rib surface 8 to increase the thickness of the lubricant layer between the roller large end face 14 of the tapered roller 4 and the rib surface 8 of the inner ring 2. As a result, it is possible to effectively reduce frictional resistance between the roller large end face 14 of the tapered roller 4 and the rib surface 8 of the inner ring 2.

In the conventional example depicted in FIG. 5, the contact ellipse M is shaped like an ellipse that is large in the circumferential direction and is small in the direction orthogonal to the circumferential direction. Most of the lubricant flowing along the rib surface 8 passes through the contact ellipse M, which is unlikely to increase the thickness of the lubricant.

As described above, in the tapered roller bearing 1 of the present embodiment, the contact ellipse M obtained by the contact between the roller large end face 14 of the tapered roller 4 and the rib surface 8 of the inner ring 2 is shaped like an ellipse that is small in the circumferential direction of the inner ring 2 and is large in the direction orthogonal to the circumferential direction. In the tapered roller bearing 1, for example, when the inner ring 2 rotates, the lubricant on the rib surface 8 flows in the circumferential direction of the inner ring 2. Thus, when the contact ellipse M has the shape, the flow of the lubricant is hindered over a wide range to increase the thickness of the lubricant layer between the roller large end face 14 of the tapered roller 4 and the rib surface 8 of the inner ring 2. Consequently, it is possible to effectively reduce frictional resistance between the roller large end face 14 and the rib surface 8. As a result, wear resistance of the tapered roller bearing 1 can be enhanced.

The tapered roller bearing of the present invention is not limited to the illustrated form but may be in any other form within the scope of the present invention. The shape of the cage 10 may be other than the illustrated shape.

According to the present invention, the thickness of the lubricant layer between the roller large end face of the tapered roller and the rib surface of the inner ring is increased, which makes it possible to effectively reduce frictional resistance between the roller large end face and the rib surface. As a result, the wear resistance of the tapered roller bearing can be enhanced.

What is claimed is:

1. A tapered roller bearing comprising:
an inner ring having a tapered inner ring raceway surface;
an outer ring having a tapered outer ring raceway surface;

a plurality of tapered rollers that is able to roll on the inner ring raceway surface and the outer ring raceway surface, the tapered rollers each having a roller large end face that is a convex curved surface; and an annular cage that holds the tapered rollers at intervals along a circumferential direction, wherein the inner ring includes a large rib portion having, on a large diameter side thereof, a rib surface that is a concave curved surface and that contacts the roller large end face, and inequalities represented by $R>Ri>Rr$ are satisfied, where $Rr$ is a curvature radius of the roller large end face, $Ri$ is a curvature radius of the rib surface in a longitudinal cross section of the inner ring, and $R$ is a curvature radius of the rib surface when the rib surface is viewed from a radially outer side in a direction orthogonal to a virtual straight line connecting a cone center to a center of a contact ellipse obtained by contact between the roller large end face and the rib surface.

2. A tapered roller bearing comprising:

an inner ring having a tapered inner ring raceway surface;

an outer ring having a tapered outer ring raceway surface;

a plurality of tapered rollers that is able to roll on the inner ring raceway surface and the outer ring raceway surface, the tapered rollers each having a roller large end face that is a convex curved surface; and an annular cage that holds the tapered rollers at intervals along a circumferential direction, wherein the inner ring includes a large rib portion having, on a large diameter side thereof, a rib surface that is a concave curved surface and that contacts the roller large end face, and a contact ellipse obtained by contact between the roller large end face of the tapered roller bearing and the rib surface of the large rib portion is shaped like an ellipse that is smaller in a circumferential direction of the inner ring than a direction orthogonal to the circumferential direction.

* * * * *